United States Patent
Terasaki

(10) Patent No.: US 7,557,568 B2
(45) Date of Patent: Jul. 7, 2009

(54) ACTUATOR WITH POSITION DETECTING MECHANISM

(75) Inventor: Atsushi Terasaki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 508 days.

(21) Appl. No.: 11/359,401

(22) Filed: Feb. 23, 2006

(65) Prior Publication Data
US 2006/0197389 A1 Sep. 7, 2006

(30) Foreign Application Priority Data
Mar. 4, 2005 (JP) .............................. 2005-061210

(51) Int. Cl.
*G01B 7/14* (2006.01)
(52) U.S. Cl. .............................. 324/207.24; 324/207.2; 324/207.21
(58) Field of Classification Search . 324/207.2–207.25, 324/173–174; 338/32 R, 32 H
See application file for complete search history.

(56) References Cited
U.S. PATENT DOCUMENTS
4,793,241 A * 12/1988 Mano et al. .................... 92/5 R
5,231,352 A * 7/1993 Huber .................... 324/207.24

FOREIGN PATENT DOCUMENTS

| JP | 59-058305 | 4/1984 |
|---|---|---|
| JP | 11-132204 | 5/1999 |
| JP | 2001-082416 | 3/2001 |
| JP | 2001-116019 | 4/2001 |

* cited by examiner

*Primary Examiner*—Jay M Patidar
(74) *Attorney, Agent, or Firm*—Oblon, Spivak, McClelland, Maier & Neustadt, P.C.

(57) ABSTRACT

A position detecting mechanism for specifying the position of a movable body using magnetism includes a magnetic device mounted to the movable body and a magnetic sensor mounted to a housing. The magnetic device includes a pair of yokes made of a magnetic substance, a plurality of permanent magnets interposed between the yokes, and a holder for holding the magnets. The magnets are disposed in such a manner that the north and south magnetic poles are in contact with the yokes on both sides.

8 Claims, 3 Drawing Sheets

(a)    (b)

ACTUATOR WITH POSITION DETECTING MECHANISM

TECHNICAL FIELD

The present invention relates to actuators including a position detecting mechanism for detecting the operating position of a movable body using magnetism.

BACKGROUND ART

For example, one of actuators, hydraulic cylinders, generally use a position detecting mechanism including a permanent magnet and a magnetic sensor to specify the operating position of pistons without contact (refer to Japanese Unexamined Patent Application publication No. 2001-116019). The position detecting mechanism has a ring-shaped permanent magnet around the outer periphery of a piston, and has the magnetic sensor formed of a magnetoresistive element, a Hall element, or a reed switch, on a cylinder housing. The magnetic sensor senses the magnetism from the magnet and outputs information on the stroke of the cylinder as an electric signal.

In general, magnetic sensors with the same sensitivity are used for cylinders of various types and bore sizes (inside diameters of the cylinders), because dedicated sensors cannot be prepared for reasons of manufacture and management. On the other hand, for the magnets, dedicated magnets appropriate to the cylinder bore sizes are generally prepared. To use the magnetic force of the magnets efficiently, it is necessary to dispose the magnets and the magnetic sensors in the position closest to each other irrespective of the shape and operating state of the cylinders.

Many cylinders are of the type in which pistons rotate, and in practical use, magnetic sensors must often be fixed to various positions on the peripheral surface of the cylinder housings for the purpose of maintenance or visual check of output using an indicator lamp. Accordingly, it is important for accurate position sensing to provide uniform magnetism for any mount positions of the magnetic sensors.

In addition, there are various cylinders depending on the designing conditions (strength, operability, and the method of manufacture). Accordingly, the magnetic sensors are not always disposed in ideal positions nearest to magnets under the designing conditions. There may be a case in which the distance between the magnet and the magnetic sensor varies among models. In this case, to give the magnetic sensor a stable magnetic force, the size and material of the magnet must be optimized to the distance between the magnet and the magnetic sensor. This indicates that if the intended purpose of cylinders with the same bore size is different, different types of permanent magnets must be prepared for the models.

As has been described, the permanent magnet is required, in sensing the position of a cylinder, to generate a stable magnetic field with a uniform magnetic distribution around the cylinder. For this purpose, it is necessary to manufacture and manage a ring-shaped permanent magnet of a size appropriate to the bore size and model. This has increased the cost for dies required to manufacture multiple types of magnets and to manage the manufactured magnets, causing an increase in product price. These problems are not only of cylinders but also present in the case where other actuators having movable bodies such as solenoid valves are equipped with a position detecting mechanism.

DISCLOSURE OF INVENTION

Accordingly, an object of the invention is to provide an actuator including a position detecting mechanism for specifying the operating position of a movable body by magnetism, in which magnetism with a uniform distribution cab be generated reliably and stably using a new magnetic device in place of a ring-shaped magnet that is fitted around the outer periphery of the moving body, thereby solving the above-described problems of the related art.

In order to solve the above-described problems, according to an aspect of the invention, there is provided an actuator with a position detecting mechanism, the actuator including: a housing; a movable body and a magnetic device moving synchronously in the housing; and a magnetic sensor mounted to the housing, for detecting the position of the piston by sensing the magnetism from the magnetic device. The magnetic device includes a pair of magnetic yokes and a permanent magnet disposed between the yokes. The magnet is disposed with the north pole and the south pole pointed to the yokes on both sides, respectively.

Preferably, the yokes of the magnetic device are circular in shape, and a plurality of the permanent magnets is disposed around the central axis of the yokes with the magnetic poles pointed in the same orientation.

Preferably, the yokes have the same size, shape, and magnetic characteristics.

Preferably, the magnet is held by a nonmagnetic holder, and the holder is sandwiched between the pair of yokes.

Preferably, the movable body is a piston driven by pressure fluid, and the magnetic device is coaxially integrated with the piston.

Preferably, the piston is divided into two piston portions at the axial center, and the magnetic device is interposed between the piston portions.

As has been described, according to an aspect of the invention, a magnetic device that generates magnetism for position sensing is a combination of a pair of yokes and a permanent magnet. Therefore magnetism having a uniform magnetic distribution can be generated stably. A magnetic device having a size and magnetic characteristics best suited to an object actuator can easily be constructed only by selecting appropriate sizes of yokes, number of magnets, and arrangement. This eliminates the need for manufacturing various kinds of ring-shaped magnets with different sizes and magnetic characteristics using multiple dies, and managing them. Thus the manufacturing cost and management cost for magnets can be greatly reduced, allowing provision of low-price products.

BRIEF DESCRIPTION OF THE DRAWINGS

FIG. 5(*b*) is a perspective view of a comparative magnetic device used in the experiment.

BEST MODE FOR CARRYING OUT THE INVENTION

Figure 1:
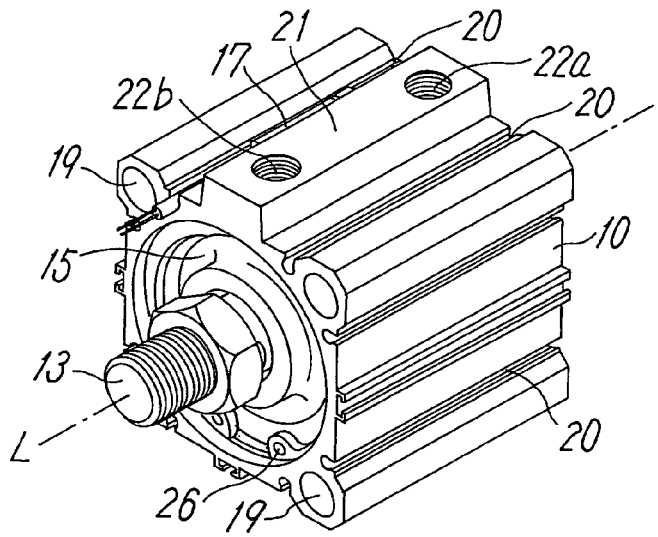
FIG. 1 is a perspective view of a cylinder according to an embodiment of the invention.
Figure 2:
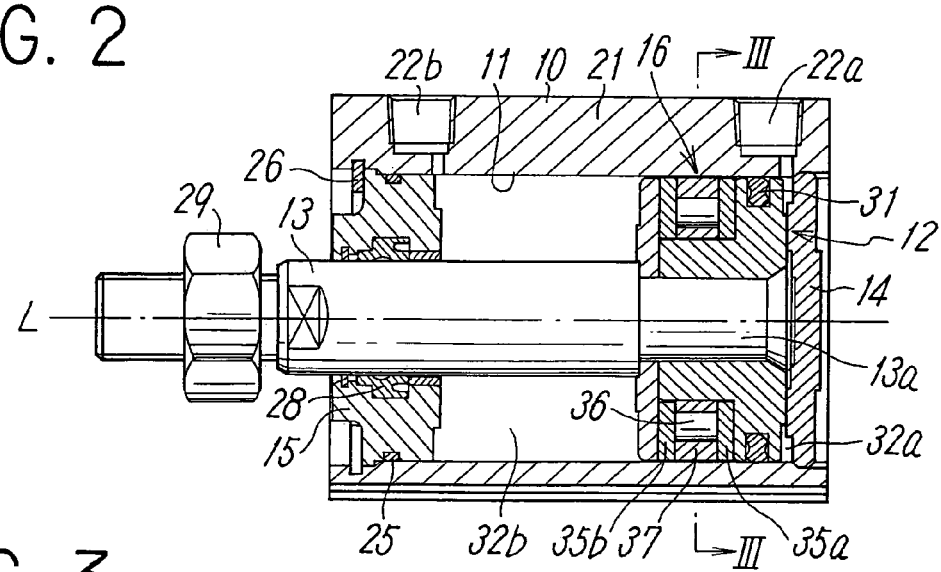
FIG. 2 is a sectional view of the cylinder of FIG. 1.
Figure 3:
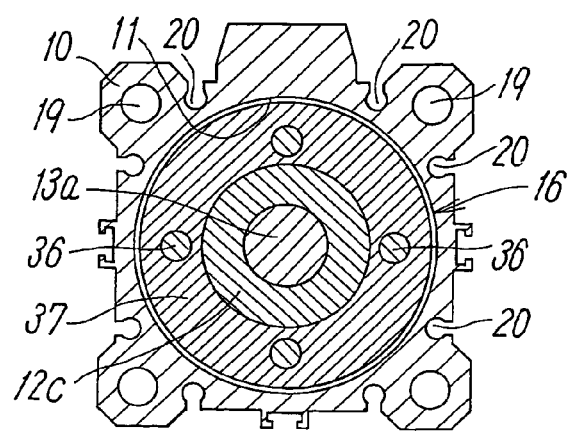
FIG. 3 is a cross-sectional view of the cylinder taken along line III-III of FIG. 2.
Figure 4:
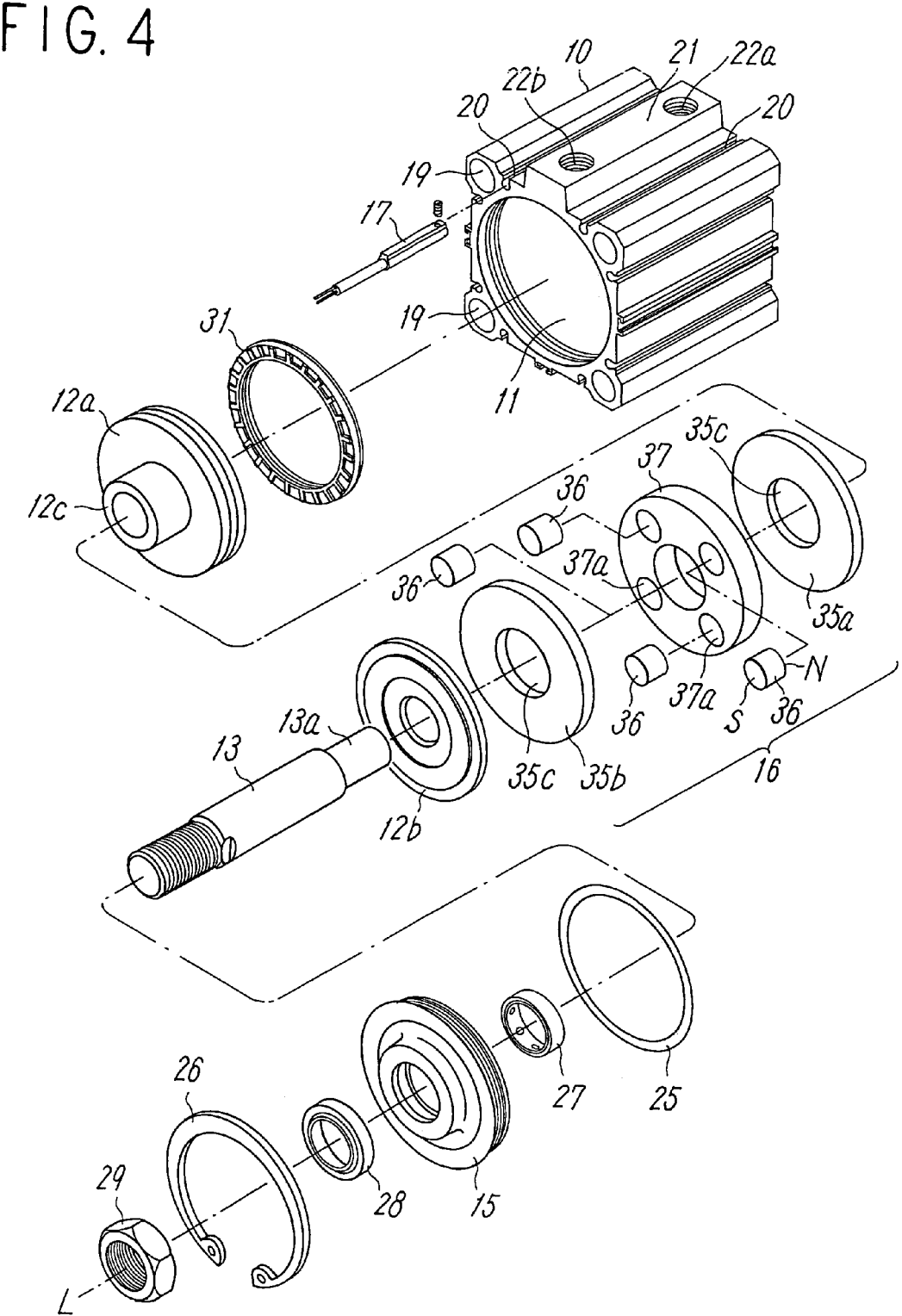
FIG. 4 is an exploded perspective view of the cylinder of FIG. 1.

FIGS. 1 to 4 show a hydraulic cylinder as an actuator with a position detecting mechanism according to an embodiment of the invention. The cylinder includes a cylinder housing 10 having a substantially rectangular outside shape. The cylinder has a structure in which a movable piston 12 is accommodated in a cylindrical bore 11 extending along the axis L in the housing 10 so as to be slidable along the axis L, and a rod 13 extending along the axis L from the piston 12 extends externally through a rod cover 15 at one end of the cylinder housing 10. The cylinder has a position detecting mechanism for detecting the operating position of the piston 12. The position detecting mechanism includes a magnetic device 16, serving as an object being sensed, mounted to the piston 12, and a magnetic sensor 17 mounted to the housing 10.

At the four corners of the housing 10, a bolt hole 19 for a bolt for fixing the cylinder in position is provided in the direction of axis L. Two sensor mounting grooves 20 for mounting the magnetic sensor 17 are provided in each of the four sides of the housing 10, in the positions near the both ends of the side and in parallel with the axis L of the cylinder, to any of which the magnetic sensor 17 can be mounted selectively. The sensor mounting grooves 20 may be provided in one or opposite two sides. The center of one side has a thick wall 21 extending along the axis L, on which two ports 22a and 22b are provided.

A head cover 14 is airtightly mounted to the end of the cylindrical bore 11 in the housing 10 adjacent to the head. The rod cover 15 is airtightly fitted on the opposite end adjacent to the rod 13 via a sealing member 25 with a retaining ring 26 that is fixed to the housing 10. The rod 13 passes through the rod cover 15 slidably via a bearing 27 and a rod packing 28. Reference numeral 29 denotes a nut for mounting a jig to the end of the rod 13.

The cylindrical bore 11 is divided into a head-side pressure chamber 32a between the piston 12 and the head cover 14 and a rod-side pressure chamber 32b between the piston 12 and the rod cover 15 by a piston packing 31 mounted around the outer periphery of the piston 12. The pressure chambers 32a and 32b communicate with one of the two ports 22a and 22b. Pressure fluid such as air is alternately charged and discharged to/from the two pressure chambers 32a and 32b through the ports 22a and 22b, respectively, so that the piston 12 reciprocates to expand and contract the rod 13. To stop the piston 12 at the end of the stroke while absorbing impact, a damper may be mounted inside the head cover 14 and the rod cover 15 as necessary.

The magnetic device 16 of the position detecting mechanism is a device for generating magnetism for position sensing. The magnetic device 16 is mounted coaxially to the piston 12. The magnetic device 16 includes a pair of yokes 35a and 35b disposed in parallel on the axis L, a plurality of permanent magnets 36 interposed between the yokes 35a and 35b, and a holder 37 for holding the magnets 36.

The pair of yokes 35a and 35b is made of a magnetic substance that is magnetized in a magnetic field, such as iron and nickel, and is shaped like a ring having a central hole 35c. The two yokes 35a and 35b have the same shape, sizes (inside and outside diameters and thickness), and magnetic characteristics.

The magnet 36 is a nonring-shaped magnet in the form of a circular-cross-section short column and extending linearly in one direction, and has the north pole and the south pole on the axially opposite ends of the magnet. The cross section of the magnet 36 may not be of the shape of a circle, but may be of the shape of, for example, a rectangle or another polygon.

The holder 37 is shaped like a ring, and is made of a nonmagnetic substance such as synthetic resin. The holder 37 is held coaxially between the pair of yokes 35a and 35b. The holder 37 has a plurality of magnet holding holes 37a at regular central angles around the axis of the holder (or the axis L of the cylinder). The magnets 36 are fitted in the magnet holding holes 37a in such a manner that the axes of the magnets 36 are parallel to the axis L of the cylinder, and the north magnetic pole and the south magnetic pole of all the magnets 36 are arranged in the same direction, respectively, so that the magnets 36 are disposed at regular central angles around the axis L, or the central axis of the yokes 35a and 35b, between the pair of yokes 35a and 35b. Accordingly, the magnets 36 are interposed between the yokes 35a and 35b, with the north magnetic pole and the south magnetic pole oriented to the yokes 35a and 35b on both sides, respectively. In this case, it is preferable that the north magnetic pole and the south magnetic pole are in direct contact with the yokes 35a and 35b, respectively.

Although, in the example of the drawings, the four magnets 36 are disposed at intervals of 90 degrees, the number of the magnets 36 may be two, three, or five or more.

Although, in the example of the drawings, the north pole of the magnets 36 points the first yoke 35a, and the south pole points the second yoke 35b, the magnets 36 may point in the opposite direction.

The yokes 35a and 35b and the holder 37 may be combined to one another with an adhesive or screws, if necessary. Alternatively, the yokes 35a and 35b and the magnets 36 may be bonded to one another, in which case the holder 37 may be omitted.

The piston 12 is divided into two first and second ring-shaped piston portions 12a and 12b at the center in the direction of the axis L. The magnetic device 16 is disposed between the piston portions 12a and 12b. The first piston portion 12a adjacent to the head is thicker than the second piston portion 12b. The first piston portion 12a has the piston packing 31 around the outer periphery. The piston 12 has a cylindrical portion 12c extending along the axis in the center of the side surface adjacent to the second piston portion 12b. The cylindrical portion 12c passes through the central holes of the yokes 35a and 35b and the holder 37 into contact with the side surface of the second piston portion 12b. A small-diameter portion 13a at the base end of the rod 13 passes through the central holes of the yokes 35a and 35b, the holder 37, and the first piston portion 12a from the second piston portion 12b, and then the end of the small-diameter portion 13a is caulked into the first piston portion 12a. Thus, the rod 13, the piston portions 12a and 12b, and the magnetic device 16 are integrated to one another.

It is preferable that the yokes 35a and 35b and the holder 37 have outside diameters so as not to come into contact with the inner periphery of the cylindrical bore 11. Although the yokes 35a and 35b and the holder 37 of the example illustrated have approximately the same diameter, they may not have the same diameter, but the yokes 35a and 35b may be slightly larger in diameter than the holder 37.

The magnetic sensor 17 is formed of a magnetoresistive element, a Hall element, or a reed switch, which is mounted in the sensor mounting grooves 20 in one of the side surfaces of the housing 10. In this case, to specify a position at one stroke end of the reciprocation of the piston 12, one magnetic sensor 17 is mounted to a position close to one end in one sensor mounting groove 20; to specify positions at the both ends of the stroke of the piston 12, two magnetic sensors 17 are mounted to a position close to one end and a position close to the other end in the two sensor mounting grooves 20.

In this cylinder, magnetic force generated from the north pole of the permanent magnets 36 along the axis L of the cylinder passes through the interior of the yoke 35a at the north pole toward the inner and outer peripheries into the other yoke 35b, and passes through the interior of the yoke 35b into the south pole of the magnets 36. At that time, a circumferential magnetic field is formed around the piston 12 by the magnetic force passing though the outer peripheries of the yokes 35a and 35b. This magnetic field moves with the movement of the piston 12, which is sensed by the magnetic sensor 17 moved at the stroke end of the piston 12.

An experiment has found that the magnetic field is of substantially a circular shape surrounding the piston 12, and has a substantially uniform magnetic distribution around the circumference.

Figure 5:
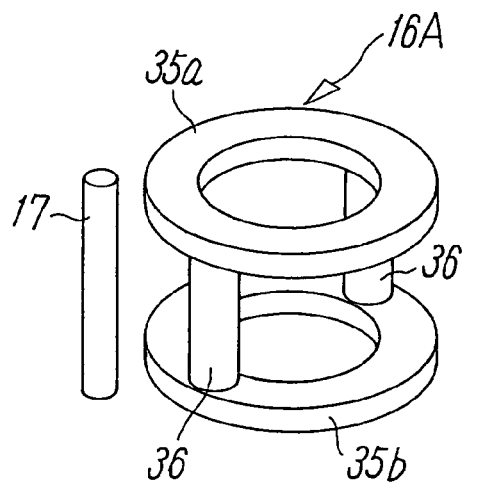
FIG. 5(*a*) is a perspective view of a magnetic device according to an embodiment of the invention, used in an experiment.
Figure 5:
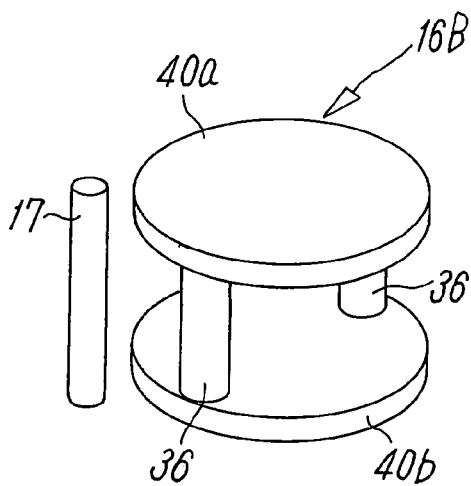
Figure 6:
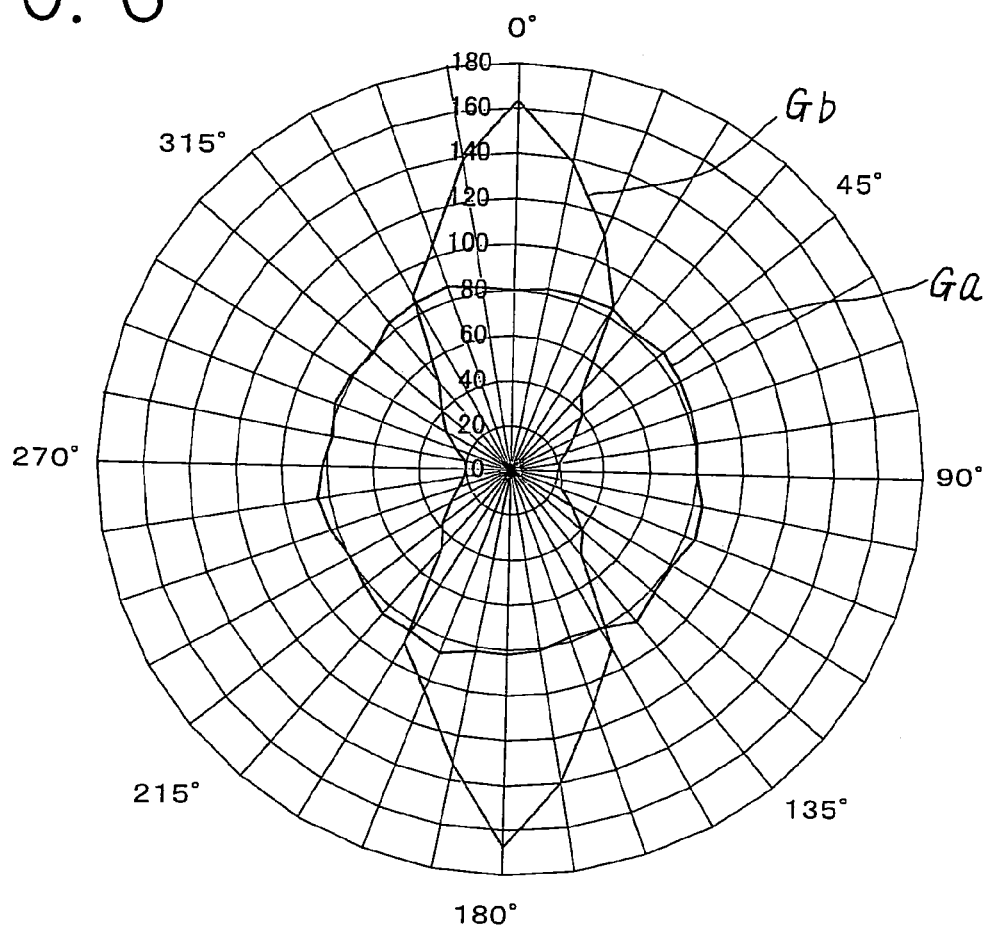
FIG. 6 is a magnetic distribution map showing the experimental results.

FIGS. 5 and 6 show the method and results of the experiment. In this experiment, a magnetic device 16A according to an embodiment of the invention and a comparative magnetic device 16B were prepared. As shown in FIG. 5(a), the magnetic device 36A has a structure in which two magnets 36 are disposed at an interval of 180 degrees between the two magnetic yokes 35a and 35b. As shown in FIG. 5(b), the magnetic device 16B has two permanent magnets 36 between two magnetic discs 40a and 40b, the two permanent magnets 36 being disposed at an interval of 180 degrees. The magnetic sensor 17 was moved around the yokes 35a and 35b and the discs 40a and 40b, respectively, to detect the points at which the magnetic sensor 17 operates. FIG. 6 shows a magnetic field distribution map on which the operating points are connected.

Experimental Conditions
    Magnet used: Rare-earth magnet
    Outside diameter=5.5 mm, Length=8 mm, Mass=1.4 g/each
    Yoke: M18 plane washer, Small circle, SPC material (iron)
    Outside diameter=29.6 mm, Inside diameter=19.5 mm, Thickness=2 mm As is evident from the experimental results of FIG. 6, for the magnetic device 16B without yokes, as indicated by magnetic distribution Gb, the magnetic field is strong around the two magnets 36, or at the position on the straight line connecting the two magnets 36 and its vicinity, but is weak at the other positions. On the other hand, for the magnetic device 16A with the yokes 35a and 35b, as indicated by magnetic distribution Ga, there is a circular magnetic field around the yokes 35a and 35b, showing a substantially uniform circumferential magnetic distribution.

In this way, combining the pair of yokes 35a and 35b and multiple permanent magnets 36 allows stable generation of magnetism having a uniform magnetic distribution. The strength of the magnetism can be controlled freely by changing the number of the magnets 36. The region to which the magnetism works can be varied freely by changing the outside diameters of the yokes 35a and 35b. Accordingly, the magnetic device 16 having a magnetic force and magnetic characteristics best suited to the models and forms of actuators can easily be obtained merely by changing the sizes of the yokes 35a and 35b and the number and arrangement of the magnets 36. Particularly, since only one kind of generally used bar magnet may be used, there is no need to manufacture various kinds of ring-shaped magnets with different sizes and magnetic characteristics using multiple dies and to manage them as in related arts. Thus the manufacturing cost and management cost for the magnets can be greatly reduced, allowing provision of low-price products.

Furthermore, since the magnetic device 16 can be used in place of the known ring-shaped magnets, it is compatible with the known devices. Accordingly, the same magnetic sensor as the known device can be used.

The magnetic device 16 may be mounted to either a head-side end or a rod-side end of the piston 12. Alternatively, the magnetic device 16 may be disposed in any position apart from the piston 12, e.g., on a position on the rod 13. Furthermore, the magnetic device 16 may be disposed at a position not coaxial with the piston 12 and the rod 13. For example, the magnetic device 16 may be disposed in a magnetic chamber disposed in the position adjacent to the cylindrical bore 11 and extending in parallel to the axis L of the cylinder, and the magnetic device 16 and the rod 13 are connected with a coupling mechanism such as a shaft so that the magnetic device 16 moves in synchronization with the piston 12. In this case, although the axis L of the cylinder and the axis of the magnetic device 16 do not agree with each other, the magnetic device 16 moves along the axis L of the cylinder, as in the foregoing embodiment.

When the piston 12 or the like is not passed through the center of the yokes 35a and 35b and the holder 37 of the magnetic device 16, the yokes 35a and 35b and the holder 37 may be shaped like a disc having no central hole. In this case, one magnet 36 may be interposed coaxially between a pair of cores.

Although the embodiment illustrated uses a straight and short column-shaped magnet 36, the magnet may be of a ring shape (including a cylinder). The ring-shaped magnet is not fitted around the outer periphery of the piston 12 unlike the related art. Accordingly, an appropriate magnet can be selected from those having no direct bearing to the sizes and shapes of the piston 12 and the cylindrical bore 11. Thus, there is no problem of manufacture and management unlike the known ring-shaped magnets to be fitted around the outer periphery of the piston 12. The ring-shaped magnet may be interposed coaxially between a pair of cores.

In the above-described embodiment, the sensor mounting grooves 20 are formed in the outer surface of the housing 10 having a substantially rectangular outer shape, in which the magnetic sensor 17 is mounted. The housing may be cylindrical in shape. In this case, sensor mounting hardware may be disposed using tie rods that connect a head cover and a rod cover that close the both ends of the housing, with which the magnetic sensor can be retained.

The cylindrical bore 11 and the piston 12 may not necessarily be circular, but may be elliptical. In this case the yokes and the holder of the magnetic device 16 are also elliptical.

The actuator equipped with the position detecting mechanism may not necessarily be the above-described hydraulic cylinder, but may be those having a movable body driven by electromagnetic force, fluid pressure, or mechanical force, such as chucks having a cylinder mechanism, solenoid valves, or switch-over valves. For solenoid valves, the movable body, the object of position sensing, is a spool for switching a channel, or a pilot piston for driving the spool. Accordingly, the magnetic device is mounted to the spool or the pilot piston, and the magnetic sensor is mounted to a housing that accommodates them.

The invention claimed is:
1. A fluid pressure equipment with a position detecting mechanism comprising:
    a housing;

a piston and a magnetic device moving synchronously in the housing by the action of fluid pressure; and a magnetic sensor mounted to the housing, for detecting the position of the piston by sensing the magnetism from the magnetic device, wherein the magnetic device is mounted to the piston and includes a pair of ring shaped yokes made of a magnetic substance and having central holes, and at least one permanent magnet disposed between the yokes, and the magnet is disposed in a state that the north pole and the south pole of the magnet point at both sides of the yokes respectively, wherein the piston is divided into a first piston portion and a second piston portion respectively located at opposite axial sides of the magnetic device such that the magnetic device is positioned in a space between the first piston portion and the second piston portion, wherein the first piston portion further comprises a central cylindrical portion extending in the axial direction of the piston at the center position of the side surface adjacent to the second piston portion, the cylindrical portion passes through the central holes of the yokes and contacting the second piston portion to fix the axial length of said space.

2. The fluid pressure equipment according to claim 1, wherein said at least one magnet comprising a plurality of permanent magnets disposed around the central axis of the yokes with the magnetic poles pointed in the same direction.

3. The fluid pressure equipment according to claim 1, wherein the pair of the yokes have the same size, shape, and magnetic characteristics.

4. The fluid pressure equipment according to claim 3, wherein said at least one magnet comprising a plurality of permanent magnets disposed around the central axis of the yokes with the magnetic poles pointed in the same direction.

5. The fluid pressure equipment according to claim 1, wherein the magnet is held by a nonmagnetic holder, the holder being sandwiched between the pair of yokes.

6. The fluid pressure equipment according to claim 5, wherein said at least one magnet comprising a plurality of permanent magnets disposed around the central axis of the yokes with the magnetic poles pointed in the same direction.

7. The fluid pressure equipment according to claim 5, wherein the pair of the yokes have the same size, shape, and magnetic characteristics.

8. The fluid pressure equipment according to claim 6, wherein the pair of the yokes have the same size, shape, and magnetic characteristics.

* * * * *

UNITED STATES PATENT AND TRADEMARK OFFICE
CERTIFICATE OF CORRECTION

PATENT NO. : 7,557,568 B2
APPLICATION NO. : 11/359401
DATED : July 7, 2009
INVENTOR(S) : Terasaki Page 1 of 1

It is certified that error appears in the above-identified patent and that said Letters Patent is hereby corrected as shown below:

On the title page, Item (30), The Foreign Application Priority Data is incorrect. Item (30) should read:

-- (30) Foreign Application Priority Data

Mar. 4, 2005 (JP) .................................. 2005-061201 --

Signed and Sealed this

Twenty-fifth Day of August, 2009

David J. Kappos
*Director of the United States Patent and Trademark Office*